United States Patent
Hayward et al.

(10) Patent No.: US 6,227,748 B1
(45) Date of Patent: May 8, 2001

(54) PROTECTIVE GAITERS FOR JOINTS

(75) Inventors: Phillip Fields Hayward, Unit 8, Chorley North Industrial Park, Chorley (GB), PR6 7BX; Simon Bidle, Leyland (GB)

(73) Assignee: Phillip Fields Hayward, Lancashire (GB)

( * ) Notice: Subject to any disclaimer, the term of this patent is extended or adjusted under 35 U.S.C. 154(b) by 0 days.

(21) Appl. No.: 09/121,612

(22) Filed: Jul. 17, 1998

(30) Foreign Application Priority Data

Jan. 17, 1996 (GB) .................................................. 9600972

(51) Int. Cl.$^7$ ....................................................... F16L 1/26

(52) U.S. Cl. ............................. 403/50; 464/175; 277/636; 277/634

(58) Field of Search ................................. 403/50, 51, 134, 403/23, 3; 277/636, 635, 634; 285/3, 4, 236, 226; 464/175

(56) References Cited

U.S. PATENT DOCUMENTS

| | | | | |
|---|---|---|---|---|
| 3,623,340 | * | 11/1971 | Maas | 403/50 X |
| 4,878,389 | * | 11/1989 | Boge | 464/175 |
| 5,027,665 | * | 7/1991 | Hayward | 277/636 X |
| 5,672,113 | * | 9/1997 | Tomogami et al. | 277/636 X |
| 5,765,837 | * | 6/1998 | Schwarzler | 277/636 |

* cited by examiner

Primary Examiner—Lynne H. Browne
Assistant Examiner—David E. Bochna
(74) Attorney, Agent, or Firm—Pearson & Pearson, LLP

(57) ABSTRACT

A protective gaiter fits around a lubricated joint such as a vehicle constant velocity joint. The gaiter is in the form of a generally conical rubber tube (10) having stepped configurations at its wider end so that it can be cut down to fit different diameters of joint members. The stepped configurations have seating areas (23 or 40–42) for a fixing strap (49) and there are flexible transitions between these areas to enable the gaiter to flex and pivot. In one embodiment the flexible transitions are inwardly directed folds (24). In a second embodiment the seating areas (41, 42) are inclined inwardly and the flexible transitions are defined by angular joints with radial linking walls (43–45).

11 Claims, 3 Drawing Sheets

PROTECTIVE GAITERS FOR JOINTS

TECHNICAL FIELD

This invention relates to protective gaiters for joints particularly although not exclusively for use in motor vehicles.

BACKGROUND ART

Flexible rubber gaiters are used in motor cars to protect constant velocity joints so as to prevent ingress of dirt and moisture and egress of lubricants. These gaiters customarily comprise moulded tubes having cylindrical end portions suitably diametered to fit the pertaining joint members and a flexible convoluted central portion. The end portions are clamped to the joint members by straps located in seating channels in the rubber gaiter.

UK Patent No. 2156452 discloses a moulded rubber gaiter of this kind further having end portions adapted by the provision of multiple fitting sections of different diameters allowing attachment to a number of different dimensions of joint members. This provides a versatile 'universal' gaiter which can be used with constant velocity joints of different motor car models by appropriate cutting away of unwanted outer zones of the fitting sections. The requisite flexibility of the gaiter is derived essentially from the central portion which may be a bellows type construction and the end portions are of limited flexibility. Whilst this arrangement is generally satisfactory, in the case where the gaiter is used with an appreciable number of remaining inner ones of the fitting sections, these remaining fitting sections impose limitations on the overall flexibility of the gaiter because the fitting sections incorporate relatively rigid seating channels for the fixing straps. This is especially problematical at the wider diameter end of the gaiter where, in use, there is considerable axial flexing as the joint members rotate and pivot relative to each other (as is the case with constant velocity joints).

With the aim of improving flexibility at the wider end portion, GB 2232729 proposes inwardly curved fitting sections with outwardly curved folds between these sections. With this arrangement, the flexibility of the wider end portion of the gaiter is enhanced by the outwardly curved folds and also by the unused curved fitting sections which act as further folds.

This arrangement has considerable advantages. However, the provision of curved folds between the fitting sections adds to the length and bulk of the gaiter thereby requiring an increased amount of material. Also, the use of flexible inner and outer curved folds at the wider end of the gaiter can give rise to collapsing of the fold structure and consequent restriction of flexibility and increased wear.

In the latter respect, where the movement of the gaiter in use involves rotation about its axis and also pivoting or flexing at a position along the axis at the wider end of the gaiter, this has the effect of bending the folds at the wider end of the gaiter at one side, in the manner of a hinge joint and this can cause collapse of the folds rather than smooth pivoting. The folds thereby become flattened or crumpled.

DISCLOSURE OF THE INVENTION

An object of the present invention is to enhance further the flexibility of the wider end portion.

According to the invention therefore there is provided a protective gaiter to fit around a lubricated joint between joint members, said gaiter comprising a generally frusto-conical flexible tubular body having first and second end portions with inner and outer surfaces thereto and a central portion between said end portions, said first end portion being wider than said second end portion and having axially spaced annular fitting sections incorporating annular seating areas around said outer surface thereof to receive a fixing device whereby the said inner surface thereof can be clamped into sealing engagement respectively with the respective said joint member, said central portion having main folds therein so as to permit axial extension of the body, said fitting sections of said wider end portion being defined by stepped configurations, and said wider end portion having flexible portions between the seating areas, characterised in that said flexible portions extend inwardly relative to said seating areas towards the axis of the gaiter to facilitate axial flexing of the gaiter at said wider end portion.

With this arrangement, flexing can take place at the wider end portion in the manner of a hinge in the vicinity of the flexible portions between adjacent seating areas. Each seating area can act as a lever pivoting at its junction with the adjacent flexible portion. Due to this mode of flexing the axial dimensions of the wider end portion of the gaiter can be kept to a minimum: it is not necessary to have a relatively long structure, such as a long curved intermediate fold, to ensure adequate flexibility. Also, in so far as flexing occurs at hinge joints at the flexible portions, there is less likelihood of collapsing occurring than in the case where flexing is required to take place essentially around a fold. It is therefore possible to maintain good flexing performance of the gaiter whether used with all fitting sections intact, or with one or more fitting sections cut away.

In accordance with one embodiment, the seating areas are at least generally axially parallel and the inwardly directed flexible portions comprise secondary folds. Due to the hinge flexing mentioned above, these folds can be of small axial dimensions.

Alternatively and preferably however, the seating areas are inclined inwardly and the flexible portions are defined by transitions between the inner end of each such area and the next adjacent fitting section.

With the latter embodiment the stepped configurations defining the annular fitting sections at the wider end portion of the gaiter may be generally Z-shaped. It is thereby possible to avoid or minimise the use of axially parallel portions of the gaiter at the wider end portion which facilitates pivoting of the gaiter without requiring incorporation of structures which appreciably increase its length. Ingeniously, the use of inclined structures permits incorporation of extra material and extra flexibility without adverse effect on other properties.

The transition between each inwardly directed seating area and the adjacent fitting section may be effected via generally radially extending walls preferably joint at acute angles to the fitting sections. These walls may be at least generally flat, as also may be the fitting sections.

Most preferably the seating areas are inclined inwardly in a direction towards the wider end portion of the gaiter.

As an alternative to the above mentioned radial walls and angular junctions, if desired the flexible portions may be defined by folds with curved transitions. These folds may be substantially J-shaped and each limb may be curved.

In the case of the above mentioned first embodiment employing secondary folds, these folds may be angular or curved in like manner to the flexible portions described in the immediately preceding paragraph.

With regard to the seating areas, these may comprise distinct channels. Alternatively, they may simply comprise surface areas, preferably flat areas with projecting structures adjoining or bounding the areas for location purposes, and which may be of greater width than the fixing device whereby such projecting structures act to facilitate location without making a close fit with the device.

With regard to the said first embodiment, the transition between the intermediate secondary folds and each seating area may be such that the seating area is substantially in the form of the top part of a fold: that is, on each side of the seating area there is a curved transition part of the adjacent intermediate secondary fold.

In a particularly preferred version of the first embodiment, each seating area is a flat or substantially flat structure and this may have a thinner wall thickness than the adjacent secondary folds in order to compensate for the reduction in flexibility arising from its flat conformation.

In order to enhance the lever and hinge joint effect described above, there may be an upwardly curved transition fold between the top of each secondary fold and the next higher seating area.

Preferably the seating areas at the wider end portion of the gaiter are uniformly spaced.

The second, narrower end portion of the gaiter may also be provided with multiple fitting sections. Alternatively this end portion may have only a single fitting section or any other suitable fitting arrangement.

The tubular body forming the gaiter may be conically tapered and stepped and may be of uniform thickness around the entire circumferential periphery thereof. The body may be of uniform thickness throughout the whole length or at least a substantial part thereof, with the possible exception of the seating areas at the wider end portion as mentioned above.

The central portion may be of a bellows-like or concertina configuration or may be formed as an S-bend or Z-bend or U-bend or the like.

The central portion may extend over a greater length than the stepped configurations at the wider end portion, and it may extend substantially over half the length of the tubular body.

Each fitting section may be appropriately configured on its inner surface for cooperation with a sealing configuration on the pertaining joint member. Thus each said seating area may have one or more circumferential ribs for cooperation with a sealing groove or grooves.

With the above mentioned first embodiment, the inner surface of each fitting portion may be generally parallel to the gaiter axis, at least in the vicinity of the seating area, whereby such inner surface can be clamped directly on to the usual axially-parallel joint member surface. With the second embodiment, the inclined fitting portions can be deflected outwardly to an axially-parallel disposition relying on the elasticity of the material.

Each fitting section may be appropriately configured on its outer surface to receive a fixing device such as a circlip or the like. Where the seating area is a channel this may have a flat or substantially flat base with an upstanding rim at each side. It is however not essential to provide precise location for the fixing device.

The gaiter may be moulded in one piece from any suitable natural or synthetic rubber or thermoplastics material.

BRIEF DESCRIPTION OF THE DRAWINGS

The invention will now be described further by way of example only and with reference to the accompanying drawings in which.

DESCRIPTION OF THE PREFERRED EMBODIMENTS

Figure 1:
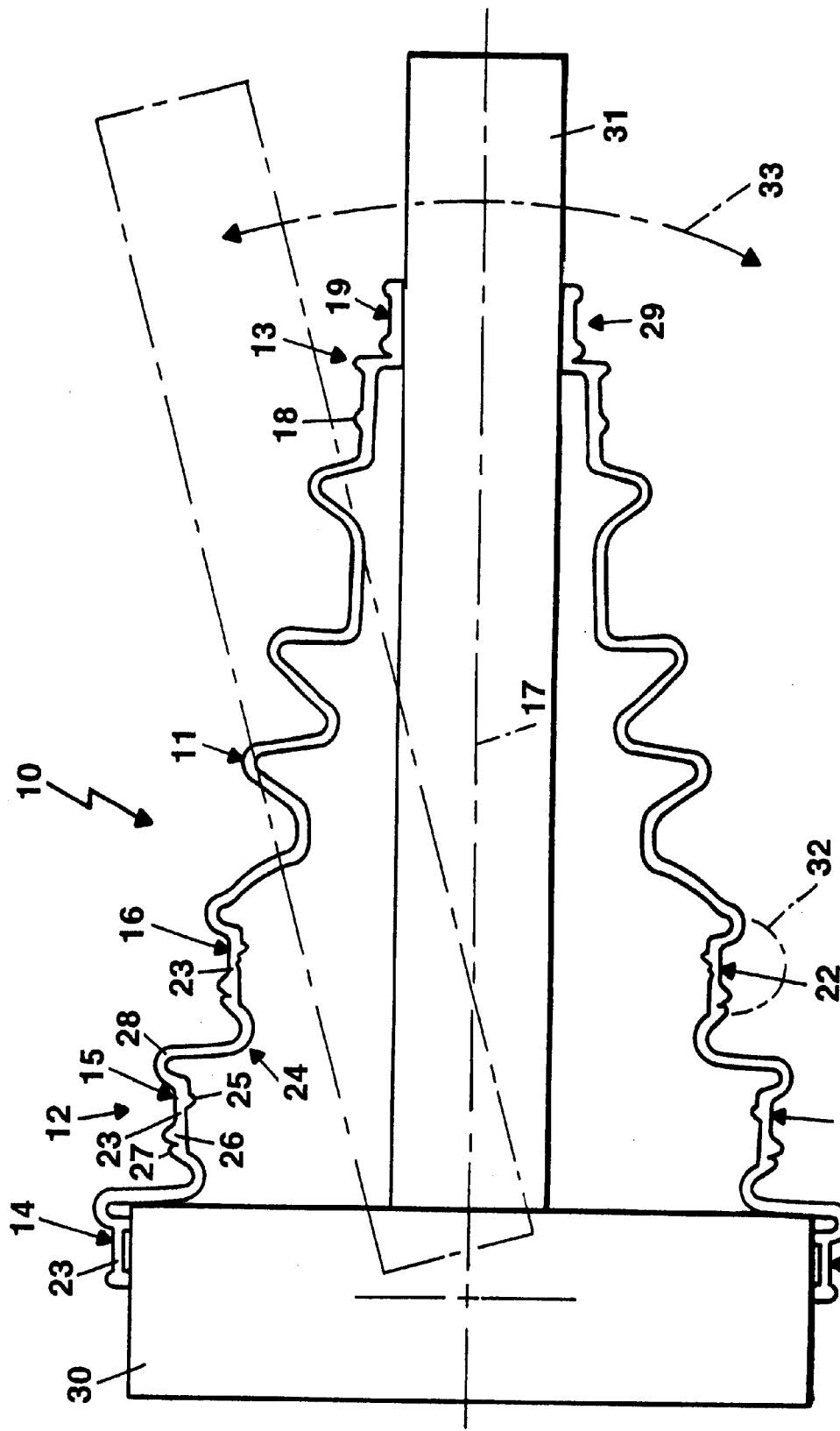
FIG. 1 is a sectional side view of one form of gaiter according to the invention in position around a joint.

The gaiter shown in FIG. 1 comprises a one-piece moulded rubber tube 10 generally of frusto-conical form having a convoluted central portion 11, a wider diameter end portion 12, and a narrower diameter end portion 13.

The wider end portion 12 of the tube is stepped to define a number of annular fitting sections 14, 15, 16 of progressively increasing diameter each of which extends generally parallel to the tube axis 17. Three such sections 14, 15, 16 are shown in the drawing, these increasing in diameter towards the pertaining free end although any suitable member may be provided. At the narrower end 13 there is a short cylindrical section 18 and then a single, generally cylindrical fitting section 19 at the pertaining free end, such sections 18, 19 extending parallel to the axis 17. These sections 18, 19 provide for attachment to different sizes of shafts (by cutting away section 19 if necessary) although alternatively a single section made from rubber of sufficient flexibility to be stretchable over different shaft sizes may be used.

The end portion 12 is suitable configured and adapted such that a relatively large amount of flexibility is permitted therein both transversely of and parallel to the tube axis 17.

Thus, each fitting section 14–16 of the wider end portion 12 has a seating channel 20–22 defined by a flat portion 23 (as viewed in cross-section) which extends parallel to the gaiter axis, linked by a reverse J-shaped intermediate fold 24 to the flat portion 23 of the next fitting section.

Each flat portion 23 has ridges 25 on its inner surface and its outer surface is bounded by an upstanding rib 26 and a bead 27 at that side which is further from the central portion 11. At the opposite side the outer surface of the flat portion 23 is bounded by a small upwardly directed transition fold 28 which merges with the top of the longer limb of the adjacent J-shaped intermediate fold 24. The top of the shorter limb of this fold 24 merges with the bead at the side of the next lower flat portion 23.

Each flat portion 23 bounded by the respective upstanding rib 25 and bead 26 on one side and by the transition fold 28 on the other side, defines a seating channel 20–22 to receive a fixing strap or tie, as also does the single seating channel 29 at the narrow diameter end portion 13 of the gaiter.

In use, as shown in FIG. 1, the gaiter is fitted around a joint, such as a motor car constant velocity joint and is secured in position (after filling with a suitable lubricant) by clamping the wider end portion 12 around a large diameter joint member 30 and the narrower end portion 13 around a small diameter shaft 31, by means of two fixing straps: one in the narrow end portion channel 29, and the other in a selected one of the wider end portion channels 20–22.

As shown in the drawing, the larger of the three channels 20 is used for fixing purposes. In the case where the gaiter is used with a smaller diameter joint member 30, one of the smaller channels 21, 22 is used and the remaining larger fitting section (or sections) can be cut away.

The ridges 25 engage grooves in the joint member 30 to ensure secure sealing.

As indicated by broken lines 32 in FIG. 1, the profile of the wider end portion 12 of the gaiter is effectively that of a concertina-type convoluted portion (similar to the central portion 11) with tops of upwardly directed folds flattened to define the seating channels 20–22.

With this arrangement, when the shaft 31 moves in use causing rotation of the gaiter and pivoting about the joint at a position within the larger end portion 12 (as shown by arrow 33), this movement is readily accommodated by easy flexing of the larger end portion 12 without tendency for folds to collapse. This is because flexing involves pivoting or bending, in the manner of a hinge joint, at the transition between the top of the longer limb of each J-shaped fold 24 and the adjacent seating channel 20–22.

In this way, good flexing with reduced wear in the context of a relatively compact construction can be achieved If desired, the seating channels 20–22 may be of reduced thickness to further facilitate flexibility.

Figure 2:
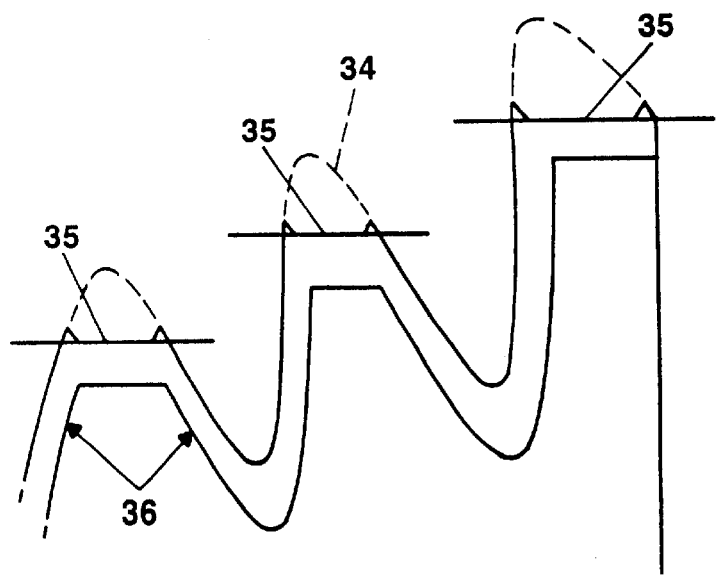
FIG. 2 is a sectional view of a detail a modification of the embodiment of FIG. 1.

The profile shown in FIG. 1 may be varied as desired and FIG. 2 shows an enlarged detail of a simplified alternative embodiment with the notional tops of the upwardly directed folds again shown in broken lines 34. Reference numerals 35 and 36 refer respectively to the seating channels and the intermediate J-shaped folds.

Figure 3:
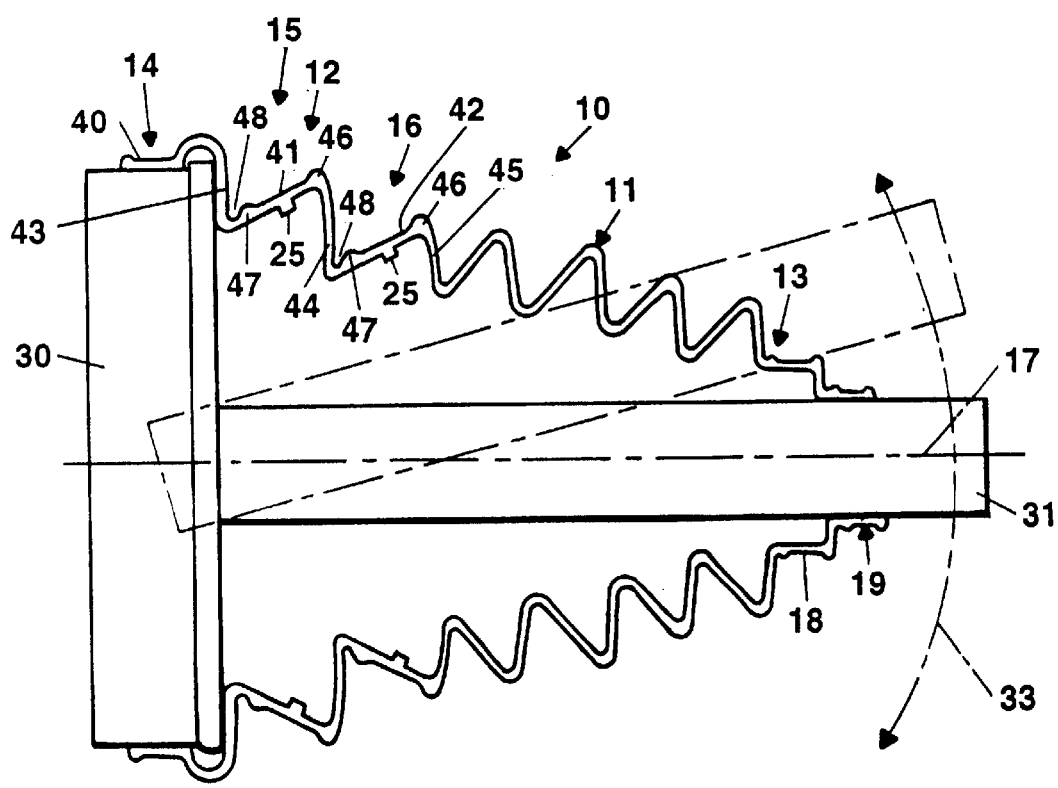
FIG. 3 is a view similar to FIG. 1 of an alternative embodiment.
Figure 4:
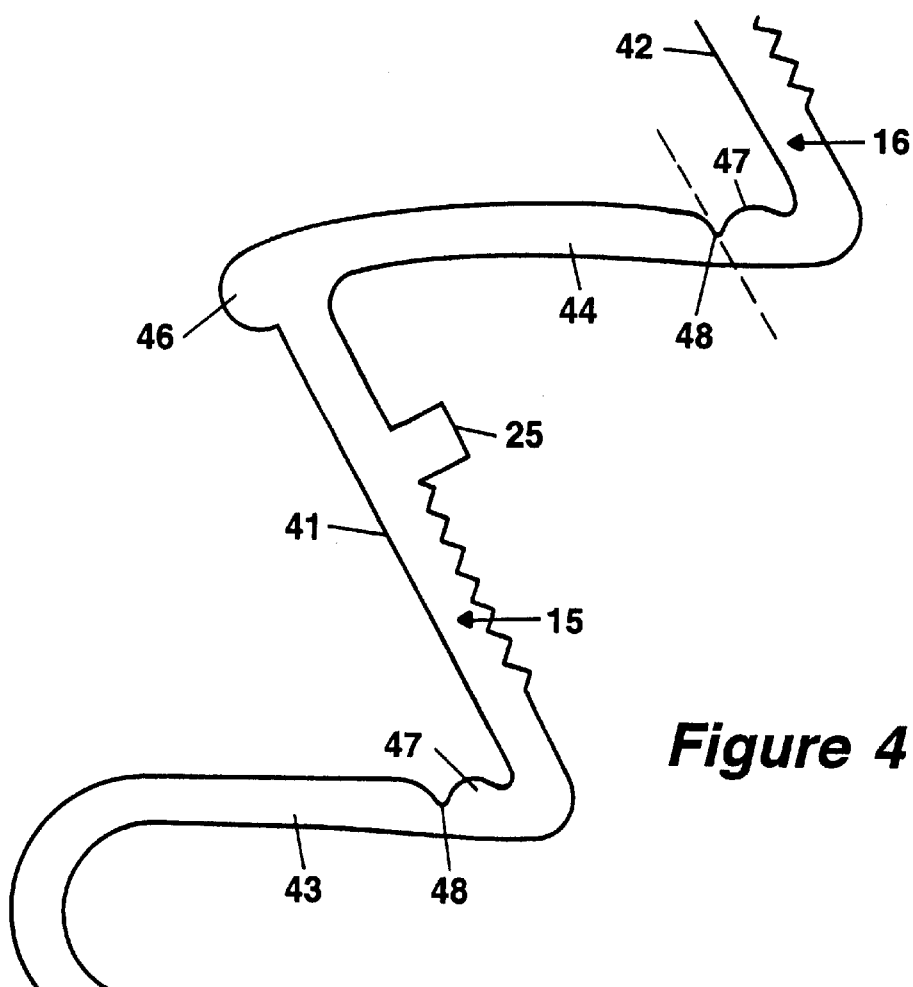
FIG. 4 is an enlarged detail of a modified version of the arrangement of FIG. 3.
Figure 5:
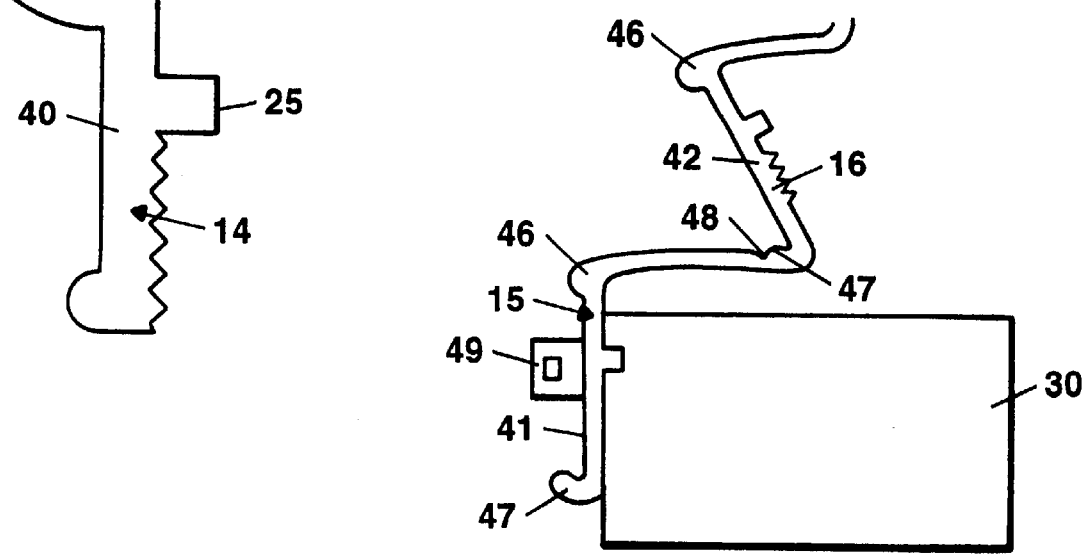
FIG. 5 is a detail showing the gaiter of FIG. 4 cut down and mounted on a joint member.

With the embodiment of FIGS. 3–5, the gaiter illustrated is similar to that shown in FIG. 1, and the same reference numerals are used to designate the same component parts.

However, each fitting section 14, 15, 16 has a flat seating area 40, 41, 42 which is inclined towards the gaiter axis 17 instead of being parallel thereto, and each seating area 40–42 is linked to the next fitting section 14–16 by means of a generally flat, generally radially extending wall 43–45, instead of the J-shaped fold 24 of FIG. 1.

Each seating area 41, 42 is bounded by outer upstanding notches 46, 47, and on its inner face there are gripper serrations and a lip 25 as described in relation to FIG. 1.

There is a cutting groove 48 adjacent to each seating area 41–42.

The inclined seating areas 41–42 are inclined inwardly in a direction towards the wider end portion of the gaiter 12. The walls 43–45 are jointed to the seating areas 41, 42 through acute angle junctions with little curvature thereto. One of the above mentioned notches 46 is located at the outermost acute angle junction on each wall 44, 45.

The seating areas 41, 42 bounded by the notches 46, 47 are not of identical construction to the seating channels 21 of FIG. 1. They have flat outer surfaces between the notches 46, 47 which are much longer than the corresponding dimension of the seating channels 21 of FIG. 1. They do not therefore form channels within which the usual fixing straps 49 are intended to fit closely. Instead they provide fitting surfaces with the notches 46, 47 acting to prevent displacement of the fixing strip 49.

FIG. 3 shows the gaiter in use with all fitting sections 14–16 intact. FIG. 5 shows the gaiter in use after it has been cut down (to remove fitting section 14). The gaiter material has sufficient elasticity to allow the remaining end fitting section 15 to be opened out from its frustro conical shape shown in FIG. 3, to a cylindrical shape shown in FIG. 5, to enable this end fitting section 15 to fit over the cylindrical joint member 30.

The fitting sections 14, 15, 16 with the linking radial walls 43–45 define a series of Z-shaped configurations which permit easy flexing of the gaiter particularly in a transverse direction as the shaft 31 pivots from side to side as indicated in FIG. 3.

During this pivoting each seating area 41–42 pivots relative to the adjoining radial walls 43–45 at the acute angle junctions with these walls in the manner of a hinged lever. This occurs easily as a consequence of the inwardly inclined seating areas 41, 42 which have the effect of increasing the lengths of rubber material in the fitting sections 15, 16 without at the same time unduly increasing the axial length of the gaiter. It is possible to attain easy pivotal movement without undue tendency for crumpling or creasing to occur, with a simple and convenient construction. The arrangement of the inclined seating areas 41, 42 and the use of the retaining notches 46, 47 instead of close-fit channels, avoids the use of axially parallel or thickened sections which hinder flexing.

Moreover these advantages are attainable with all fitting sections 14–16 retained, or with one or more fitting sections 14–16 removed. Essentially, the gaiter has excellent flexing properties throughout its entire length and particularly at its wider end portion.

The invention is not intended to be restricted to the details of the above embodiment which are described by way of example only. Thus for example, FIG. 3 shows provision of both notches 46, 47, and the cutting groove 48, on the seating area 41, 42 of the gaiter. As indicated in FIGS. 4 & 5, one notch 47 and the cutting groove may alternatively be positioned at the start of the adjacent side wall 43, 44.

As described the gaiter is a one-piece tube. However it may also be possible to form the gaiter with one or more longitudinal slits therealong so that the gaiter can be fitted without separating the joint members by wrapping the gaiter around the joint and then sealing the slit (or slits) in known manner.

It is of course to be understood that the invention is not intended to be restricted to the details of the above embodiment which are described by way of example only.

What is claimed is:

1. A protective gaiter to fit around a lubricated joint between joint members, said gaiter comprising a generally frusto-conical flexible tubular body having first and second end portions with inner and outer surfaces thereto and a central portion between said end portions, said first end portion being wider than said second end portion and having axially spaced annular fitting sections incorporating annular seating areas around said outer surface thereof to receive a fixing device whereby the said inner surface thereof can be clamped into sealing engagement respectively with the respective said joint member, said central portion having main folds therein so as to permit axial extension of the body, said fitting sections of said wider end portion being defined by stepped configurations, and said wider end portion having flexible portions between the seating areas, wherein said flexible portions between the seating areas of the wider end portion extend inwardly relative to said seating areas towards the axis of the gaiter to facilitate axial flexing of the gaiter at said wider end portion and characterised in that the seating areas are inclined inwardly and the said flexible portions are defined by transitions between the inner end of each such area and the next adjacent fitting section.

2. A gaiter according to claim 1 characterised in that the said stepped configurations defining the annular fitting sections at the wider end portion of the gaiter are generally Z-shaped.

3. A gaiter according to claim 2 characterised in that the said transitions comprise generally radially extending walls.

4. A gaiter according to claim 3 characterised in that the said walls are joined at acute angles to the seating areas.

5. A gaiter according to claim 1 characterised in that the seating areas are inclined inwardly in a direction towards the wider end portion of the gaiter.

6. A gaiter according to claim 1 characterised in that each seating area comprises a flat surface area between projecting structures.

7. A gaiter according to claim 1 characterised in that the seating areas at the wider end portion of the gaiter are uniformly spaced.

8. A gaiter according to claim 1 characterised in that the second, narrower end portion of the gaiter is also provided with multiple fitting sections.

9. A gaiter according to claim 1 characterised in that the said tubular body of the gaiter is conically tapered and stepped.

10. A gaiter according to claim 1 characterised in that the tubular body is of uniform thickness throughout.

11. A gaiter according to claim 1 characterised in that each seating area has an inner rib for cooperation with a sealing groove on the respective joint member.

* * * * *